Patented June 29, 1926.

1,590,718

UNITED STATES PATENT OFFICE.

FRITZ BALLAUF, FRIEDRICH MUTH, AND ALBERT SCHMELZER, OF ELBERFELD, GERMANY, ASSIGNORS TO GRASSELLI DYESTUFF CORPORATION, OF NEW YORK, N. Y.

VAT SULPHIDE DYES.

No Drawing. Application filed January 16, 1925, Serial No. 2,927, and in Germany January 24, 1924.

We have invented new and useful improvements in vat sulphide dyes of which the following is a specification.

Our invention consists in the production of new dyestuffs capable of dyeing in a reducing vat, and which are obtained by submitting to a sulphur melt the carbazoloic-acid-arylid-indophenols, described in our copending application Serial No. 2926 filed January 16, 1925. These carbazoloic-acid-arylid-indophenols are obtained by reacting with primary and secondary amines in presence of condensing agents upon carbazoloic acids. the carbazoloic acid arylids obtained in this way condense easily with nitroso-phenols and the arylid-indophenols obtained are of the following general formula: The sulphur

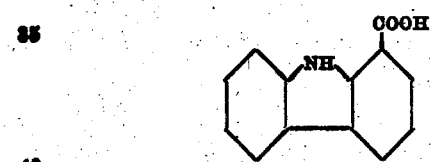

containing vat colors dye from the reducing bath shades, which by oxidation turn from blue to bluish-black to deep black and which dyeings are distinguished by excellent fastness properties, particularly to chlorine and to boiling.

The arylid-indophenols from the different carbaxoloic acids, as for example, the carbazol-1-carboxylic acid

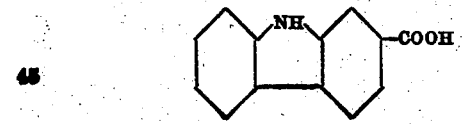

the carbazol-2-carboxylic acid,

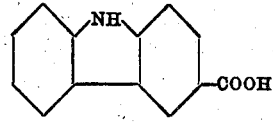

the carbazol-3-carboxylic acid,

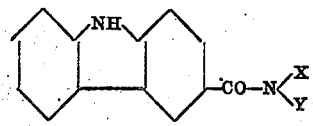

can be used; the hydroxyl group being substituted by primary or secondary aliphatic or aromatic amines, arylides of the type:

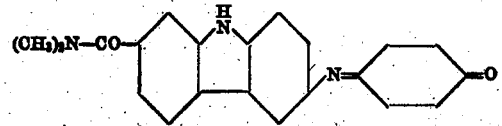

are obtained, in which formula X stands for hydrogen or a carbon radical and Y for a carbon radical.

Any of the known methods of sulphurization will yield valuable dyestuffs from these arylid indophenols, but our preferred process is to treat them in alcoholic solution at boiling temperature with sodium sulphite and sulphur, which process is generally known as the alcoholic reflux fusion.

The following examples will further illustrate our invention, it being understood that for the practice of our invention we do not limit ourselves to the specific conditions nor to the specific carbazoloic acid arylid-indophenols mentioned.

*Example 1.*—60 parts by weight of 2-carbazoloic acid-dimethyl-amid-indophenol having the formula:

are dissolved in 1950 parts of alcohol and 190 parts anhydrous sodium sulphide and 525 parts sulphur added. The reaction mass is boiled at reflux for 120 hours. The alcohol is distilled off, the residues digested with water, and the insoluble dyestuff filtered off. The unreacted sulphur contained in this crude product is extracted with carbon-disulphide and the purified color dried. It represents a deep black powder, insoluble in water and in sodium sulphide solutions. With sodium hydrosulfite it forms a yellow vat, from which cotton is dyed shades which, by oxidation, turn dark blue, and which shades are of excellent fastness particularly to chlorine and boiling.

Example 2.—72 parts of the 2-carbazoloic acid-para-toluidindophenol having the formula:

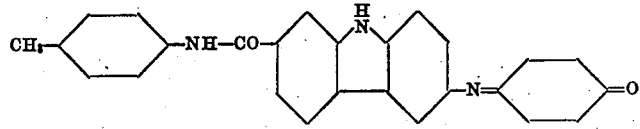

are submitted, as in Example 1, to the alcoholic reflux sulphur fusion. The residue, after the alcohol has been distilled off, is taken up with a sodium sulphide solution to dissolve the unreacted sulphur, the dyestuff is then filtered off, washed with water and dried. The dyestuff is a black powder, insoluble in water and in sodium sulphide solution, soluble in concentrated sulphuric acid with blue green color. In sodium hydrosulfite solutions it forms a yellow vat, from which cotton is dyed, after oxidation, exceedingly fast bluish black shades.

Example 3.—72 parts by weight of 3-carbazoloic-acid-para-toluid-indophenol having the formula:

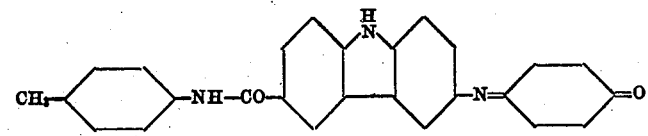

are dissolved in 1950 parts of alcohol and 190 parts anhydrous sodium sulphide and 525 parts sulphur added. The fusion is heated at reflux for 120 hours and the residue, after distilling the alcohol, purified by treating same with a sodium sulphide solution. The insoluble dyestuff is filtered off, washed with water and dried. It is a dark black powder, insoluble in water and sodium sulphide solutions, soluble in concentrated sulphuric acid with a blue green color. With sodium hydrosulfite solutions it forms a yellow colored vat, from which cotton is dyed, after oxidation, a greenish black of excellent fastness.

Example 4.—90 parts of 1-carbazoloic-acid-2-carbazolamidindophenol are dissolved in 1950 parts of alcohol, and 190 parts anhydrous sodium sulphide and 525 parts sulphur added. The fusion is refluxed for 120 hours, the alcohol distilled off and the color purified from unreacted sulphur by treating same with a sodium sulphide solution. Filtered off, washed and dried the color represents a dark black powder, soluble in concentrated sulphuric acid with blue green color, insoluble in water and sodium sulphide solutions. With sodium hydrosulfite it forms a yellow vat from which cotton is dyed, after oxidation, exceedingly fast dark blue shades.

We claim:—

1. The process of producing vat sulphide dyes which consists in submitting to the sulphur fusion carbazoloic-acid-arylid-indophenols.

2. The process of producing vat sulphide dyes which consists in submitting to the sulphur fusion 2-carbazoloic-acid-arylid-indophenols.

3. The process of producing a vat sulphide dye which consists in submitting to the sulphur fusion the 2-carbazoloic acid dimethylamid indophenol.

4. In processes of producing vat sulphide dyes the steps comprising dissolving a carbazoloic-acid-arylid-indophenol in alcohol and heating this solution in presence of sodium sulphide and sulphur to effect sulphurization.

5. In processes of producing vat sulphide dyes the steps comprising dissolving 2-carbazoloic-acid-arylid-indophenols in alcohol and heating this solution in presence of sodium sulphide and sulphur to effect sulphurization.

6. In the process of producing a vat sulphide dye the steps comprising dissolving 2-carbazoloic-acid dimethylamid indophenol in alcohol and heating this solution in presence of sodium sulphide and sulphur to effect sulphurization.

7. As new products the vat sulphide dyes, obtainable by the sulphurization of carbazoloic-acid-arylid-indophenols, which dyestuffs are dark black powders, insoluble in water and sodium sulphide solutions, soluble in concentrated sulphuric acid with from blue to green blue colors, giving with sodium hydrosulfite yellow vats, from which cotton is dyed, after oxidation, from blue to black shades of exceedingly good fastness.

8. As new products the vat sulphide dyes, obtainable by the sulphurization in alcohol solution of carbazoloic-acid-arylid-indophenols, which dyestuffs are dark black powders, insoluble in water and in sodium sulphide solutions, soluble in concentrated sulphuric acid with from blue to green blue colors, giving with sodium hydrosulfite yellow colored vats, from which cotton is dyed, after oxidation, in from blue to black shades, particularly fast to chlorine and boiling.

9. As a new product the vat sulphide dye obtainable by sulphurization in alcoholic solution of 2-carbazoloic-acid-dimethylamid-indophenol, which dyestuff is a black powder, insoluble in water and in sodium sulphide solutions, soluble in concentrated sulphuric acid with a blue green color giving with sodium hydrosulfite a yellow colored vat from which cotton is dyed, after oxidation, exceedingly fast dark blue shades.

In testimony whereof we have hereunto set our hands.

FRITZ BALLAUF.
FRIEDRICH MUTH.
ALBERT SCHMELZER.